Jan. 15, 1946. J. MUROS Re. 22,708

SAFETY RAZOR

Original Filed Oct. 16, 1935 2 Sheets-Sheet 1

Inventor

Joseph Muros, by H. M. Kenway,

Attorney

Jan. 15, 1946. J. MUROS Re. 22,708

SAFETY RAZOR

Original Filed Oct. 16, 1935 2 Sheets-Sheet 2

Inventor
Joseph Muros.
by H. H. Yeiway.
Attorney

Reissued Jan. 15, 1946

Re. 22,708

UNITED STATES PATENT OFFICE 22,708

SAFETY RAZOR

Joseph Muros, Cambridge, Mass., assignor to Gillette Safety Razor Company, Boston, Mass., a corporation of Delaware Original No. 2,060,520, dated November 10, 1936, Serial No. 45,299, October 16, 1935. Application for reissue October 10, 1945, Serial No. 621,585

6 Claims. (Cl. 30—60)

This invention relates to safety razors of the type employing a sectional cap in combination with an actuating member connected to the cap sections and movable to swing them simultaneously toward or from blade-clamping position. An example of such a razor is to be found in my own prior Patent No. 1,992,038.

The object of the present invention is to simplify the mechanism for swinging the cap sections and for rapidly moving the blade supporting member in the razor to flex and clamp the blade. As herein shown, the cap sections are pivotally mounted by supporting arms in the razor head and are connected to a common actuating member which in this case comprises a blade supporting plate having connections for swinging the cap sections simultaneously. A compact and effective connection is produced, as herein shown, by providing the cap sections and the blade supporting plate with parallel adjacent arms and providing an angular cam slot in one set of arms and a cam pin in the cooperating set of arms. The cam slot may be designed to impart a rapid closing movement to the cap sections during the initial movement of the actuating plate and then to hold the cap sections in closed position during the final blade-clamping movement of the plate. Each cap section is further shown as equipped with a guard member which is movable in an arcuate path away from the blade when the cap section is swung into open position, thus leaving the blade in a particularly open and easily-accessible position for removal or replacement.

Another feature of the invention resides in novel mechanism for imparting rapid and light movement to the cap sections. As herein shown, this mechanism comprises a double-threaded member arranged to be rotated by the user for imparting a high speed movement to the actuating plate. This construction offers a compact reliable mechanism capable of convenient manipulation and of light weight and is, therefore, highly desirable in the construction of an improved safety razor.

These and other features of the invention will be best understood and appreciated from the following description of a preferred embodiment thereof, selected for purposes of illustration and shown in the accompanying drawings, in which.

Figure 1:
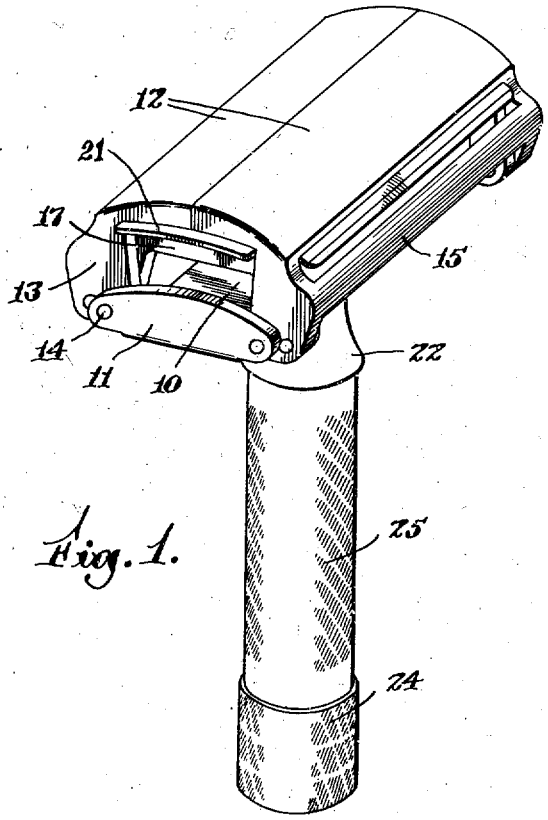
Fig. 1 is a view in perspective on an enlarged scale of the razor in closed position.

In the preferred embodiment of the present invention the frame of the razor includes an elongated plate 10 having end flanges 11 turned up at right angles to the body of the plate. The cap sections 12, each provided with downwardly extending arms 13, are pivotally mounted by pivot pins 14 between the opposite ends of the end flanges 11 of the razor head. Each of the cap sections, in addition to its blade engaging portion, is provided with a bar guard 15 outwardly convex in shape and located slightly beneath and in advance of the cutting edge of the blade. The bar guard 15 is separated from the body of the cap section by an elongated opening through which the edge of the blade projects when clamped in shaving position. Each cap section arm 13 also carries a short inwardly extending cam pin 16 whose function will be presently explained.

In the razor illustrated, the functions of the blade carrier and the actuating device for the cap sections are combined in an elongated plate 17 which, in the open position of the razor, lies between the end flanges 11 and is provided at each corner with a downwardly extending arm provided with an angle cam slot 18. The arms of the blade carrier plate 17 lie inside the corresponding arms 13 of the cap sections and in sliding contact therewith and one of the cam pins 16 on each cap section arm projects into the cam slot and is controlled in its position by the movement of the cam slot with the blade carrier plate 17. The carrier plate is also provided in its upper face with a pair of upwardly projecting studs 19 herein shown as being of diamond-shaped contour and adapted to fit in correspondingly shaped blade apertures to locate a blade accurately in position upon the blade carrier 17. The plate itself is rigidly mounted upon the upper end of a stem 20 which projects downwardly into the handle of the razor and is threaded at its lower end. A blade 21 is shown in position upon the blade carrier in Figs. 1 to 4 and it will be understood that the blade is perforated to fit upon the studs 19 and provided with corner recesses defining elongated unsharpened portions at each end of the blade which project slightly beyond the ends of the cap sections 12.

The razor head includes a neck 22, circular in cross-section and rigidly secured to the elongated plate 10 of the frame. The neck is provided at its lower end with a centrally disposed bore 23 internally threaded at its lower end. The neck 22 is externally shouldered to receive the barrel 25 of the handle, and within the barrel is disposed an elongated nut 24, reduced in diameter at its upper end and threaded into the bore of the neck 22. The nut is also provided with a centrally-disposed bore which is threaded to receive the lower end of the blade-carrier stem 20. As herein shown, the outside thread of the nut 24 is a right-hand thread, and the thread of the stem 20 is a left-hand thread. The result is that, when the user turns the nut 24 toward the right, the stem 20 will be elevated in a rapid movement equalling the sum of the pitch of the two threads for each revolution of the nut 24. When the nut is turned in a left-hand direction, the stem 20 will be lowered at a correspondingly rapid rate.

Figure 2:
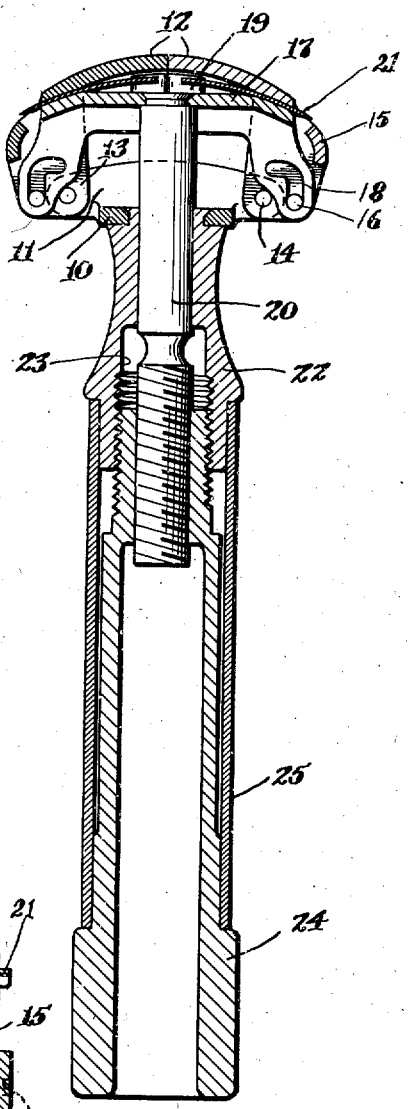
Fig. 2 is a view of the razor in vertical cross-section.
Figure 3:
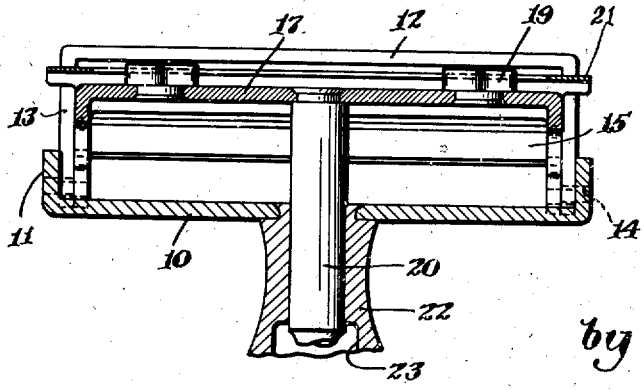
Fig. 3 is a view of the razor head in cross-section at right angles to that shown in Fig. 2.
Figure 4:
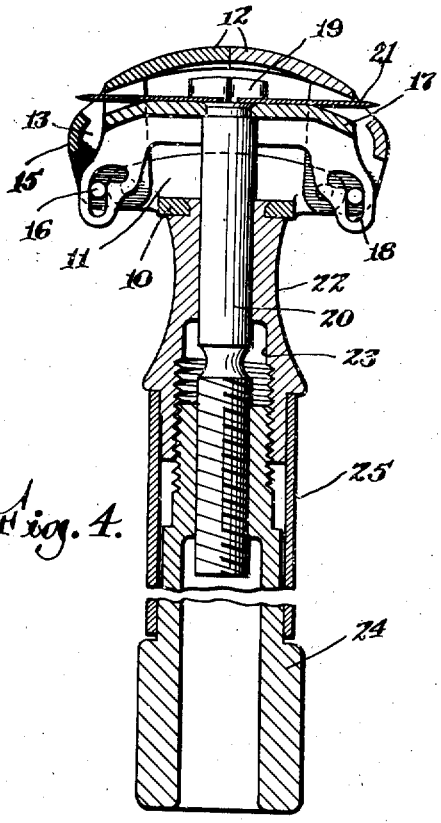
Fig. 4 is a view of the razor in vertical cross-section showing the cap sections closed and the blade supporting plate in mid position.
Figure 5:
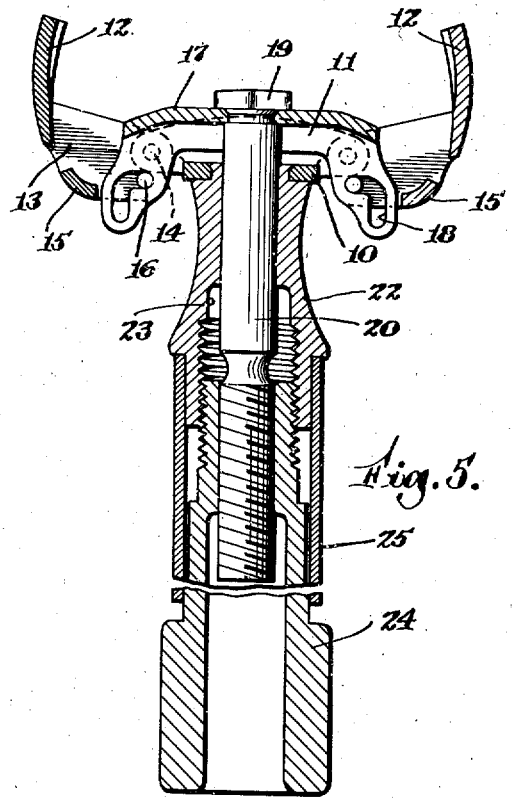
Fig. 5 is a similar view showing the cap sections in open position.
Figure 6:
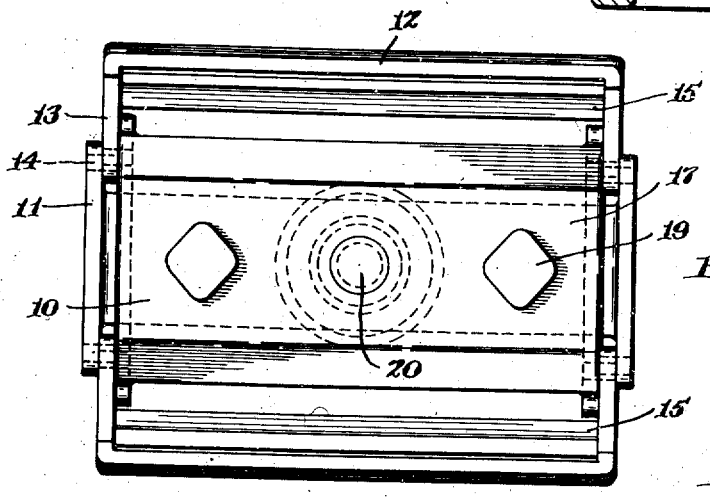
Fig. 6 is a plan view of the razor head.

Assuming now that the razor is clamped in shaving position as shown in Fig. 2 and that the user desires to open the razor for purposes of replacing or cleaning the blade, in turning the nut 24 to the left he first lowers the blade carrier 17 from the position shown in Fig. 2 to the position shown in Fig. 4, releasing the blade from the pressure of the cap sections 12 and permitting it to assume a flat position. In this movement the vertical portions of the cam slot 18 travels downwardly with respect to the cam pins 16 and no swinging movement is imparted to the cap sections 12. However, as the downward movement of the plate 17 is continued the horizontal portion of the cam slots 18 comes into play and the pins 16 are forced to move inwardly beneath the pivotal axis of the cap section which are, therefore, swung rapidly outwardly into their wide open position, as shown in Fig. 5. In this position, the face of the blade carrier 17 is fully exposed and the blade may be conveniently removed or replaced. When it is again desired to close the razor and clamp the blade in shaving position the nut 24 is turned in a right-hand direction whereupon the cams of the carrier plate act first to swing the cap sections into closed position, as shown in Fig. 4 and then to hold them in this position while the carrier plate completes its upward movement clamping the blade against the inner concave surface of the cap sections 12.

Having thus described my invention what I claim as new and desire to secure by Letters Patent is:

1. A safety razor having, in combination, a stationary support, cap sections pivotally mounted thereon, a movable blade-supporting plate and an angle slot and pin connection between said plate and the cap sections, whereby, in the upward movement of the plate the cap sections are first closed and then locked in closed position by said connection.

2. A safety razor having, in combination, a stationary support, cap sections pivotally mounted thereon through the medium of downwardly extending arms, and a vertically movable blade-supporting plate having arms with right angle cam slots therein disposed adjacent to the arms of the cap sections, and cam pins projecting from the arms of the cap sections into said slots and movable therein first to swing and then to lock the sections.

3. A safety razor having, in combination, a support with stationary cross arms, cap sections with downwardly extending arms at each end which are pivotally connected to said cross arms, and a blade-supporting plate vertically movable between said cross arms and having angular cam slots therein which are so connected to the arms of the cap sections as to swing and lock the sections in closing the razor.

4. In a safety razor, a cap comprising separate relatively movable, co-operating sections each formed with a guard member therein and mounted to swing about an axis outside the guard member.

5. A safety razor having a blade-supporting member, cap sections pivotally mounted respectively to swing about axes parallel to and remote from the edges of a blade on said support and each having a bar guard defining a slot in the cap arranged to receive a blade edge when the cap sections are closed.

6. A safety razor having a blade-supporting member, co-operating blade-clamping sections mounted respectively to swing about axes located beneath said member and each having a guard movable bodily toward or away from the edge of a blade on the support when the section is swung about its axis.

JOSEPH MUROS.